United States Patent
Kahan et al.

(10) Patent No.: US 7,253,791 B2
(45) Date of Patent: Aug. 7, 2007

(54) SELECTIVE VIEWING ENABLEMENT SYSTEM

(75) Inventors: Eduardo T. Kahan, Longwood, FL (US); Anthony Edward Martinez, St. Augustine, FL (US)

(73) Assignee: International Business Machines Corporation, Armonk, NY (US)

( * ) Notice: Subject to any disclaimer, the term of this patent is extended or adjusted under 35 U.S.C. 154(b) by 615 days.

(21) Appl. No.: 10/713,982

(22) Filed: Nov. 13, 2003

(65) Prior Publication Data

US 2005/0140572 A1    Jun. 30, 2005

(51) Int. Cl.
*G09G 5/00* (2006.01)

(52) U.S. Cl. ............................ 345/8; 345/9

(58) Field of Classification Search ............ 345/7, 345/8, 9; 348/42, 51, 77, 78; 713/176
See application file for complete search history.

(56) References Cited

U.S. PATENT DOCUMENTS

| | | | |
|---|---|---|---|
| 4,736,420 A | 4/1988 | Katznelson et al. ........ 380/11 |
| 5,691,737 A * | 11/1997 | Ito et al. ............... 345/8 |
| 5,956,001 A | 9/1999 | Sumida et al. ............ 345/55 |
| 6,115,177 A | 9/2000 | Vossler .................. 359/465 |
| 6,295,065 B1 | 9/2001 | Tettington .............. 345/419 |
| 6,353,422 B1 * | 3/2002 | Perlman ................. 345/7 |
| 6,456,432 B1 * | 9/2002 | Lazzaro et al. .......... 359/464 |
| 7,030,902 B2 * | 4/2006 | Jacobs ................. 348/42 |

* cited by examiner

*Primary Examiner*—Richard Hjerpe
*Assistant Examiner*—Jean Lesperance
(74) *Attorney, Agent, or Firm*—David A. Mims, Jr.; Robert V. Wilder

(57) ABSTRACT

A method and implementing system are provided for enabling a user, through the use of a specialized viewing device, to view information on a display device which is not viewable by others who are not equipped with the device. In an exemplary embodiment, selected sensitive information on a display screen is obscured from normal view. A view-enabling device is provided to authorized individuals who are able to use the device to view the sensitive information on the display device. The user looks through the view-enabling device and is able to see the otherwise obscured sensitive information. Obscuring fields are overlaid upon the sensitive information during an obscuring phase at a known overlay frequency and the view-enabling device is synchronized to effectively block-out the user's view of the display during the obscuring phase resulting in an un-obscured view of the sensitive information on the display device to the user.

28 Claims, 5 Drawing Sheets

MEMBERSHIP/NEW ACCOUNT INFORMATION

| | | |
|---|---|---|
| Are you already a member? | ● Yes | ○ No |
| If yes, Account Number: | 123456789 | 401 |
| First Name: | Anthony | |
| Last Name: | Martinez | |
| Address: | 11400 Burnet Road | |
| City: | Austin | |
| State: | Texas | |
| Zip Code: | 78758 | |
| Home Phone: | 512-246-2468 | |
| Work Phone: | 512-246-4689 | |
| Social Security Numbert: | 101-22-3333 | 403 |
| Driver's License: | 70934178 | 405 |
| Date of Birth: | 3-13-1957 | 407 |
| E-Mail Address | anthony@corp.com | |

*FIG. 4*

MEMBERSHIP/NEW ACCOUNT INFORMATION

| | | |
|---|---|---|
| Are you already a member? | ● Yes    ○ No | |
| If yes, Account Number: | 8888886888 | 501 |
| First Name: | Anthony | |
| Last Name: | Martinez | |
| Address: | 11400 Burnet Road | |
| City: | Austin | |
| State: | Texas | |
| Zip Code: | 78758 | |
| Home Phone: | 512-246-2468 | |
| Work Phone: | 512-246-4689 | 509 |
| Social Security Numbert: | 8888888883 | 503 |
| Driver's License: | 8888888888 | 505 |
| Date of Birth: | 88888888 | 507 |
| E-Mail Address | anthony@corp.com | |

*FIG. 5*

MEMBERSHIP/NEW ACCOUNT INFORMATION

Are you already a member?   ● Yes   ○ No

If yes, Account Number:    123456789  —601

First Name:    Anthony

Last Name:    Martinez

Address:    11400 Burnet Road

City:    Austin

State:    Texas

Zip Code:    78758

Home Phone:    512-246-2468

Work Phone:    512-246-4689

Social Security Numbert:    101-22-3333  —603

Driver's License:    709341­78  —605

Date of Birth:    3-13-1957  —607

E-Mail Address    anthony@corp.com

SELECTIVE VIEWING ENABLEMENT SYSTEM

FIELD OF THE INVENTION

The present invention relates generally to information processing systems and more particularly to a methodology and implementation for enabling selective viewing of information presented on a display device.

BACKGROUND OF THE INVENTION

As personal computers, laptop computers and individual workstations continue to propagate and populate desktops and laptops, more and more information is being processed on display screens which are visible to anyone in the general area who happens to pass by near the display. Most applications being worked on the computer screens contain sensitive information and even confidential information which should not be displayed for public viewing. Nevertheless, there is no effective means for hiding such information from public display when a user is working the application.

In certain environments, this need is endemic. For example, in work areas where there are large areas of individual data processing stations, there is a need to protect at least portions of displayed data from curious unauthorized eyes. For example, it is necessary to protect displayed information from public view in most hospital registration areas, banks, airline terminals, research centers and military installations. Existing security safeguards are not entirely effective in many applications where information is made available only on a "need-to-know" basis. In many environments, system screen "lock-outs" including screen blocks or masks, to the extent they are effective at all, are only effective if the operator turns on the screen lockout feature and such means are not effective at all while the operator is working on a displayed application. Privacy screen overlays are also not effective especially when an operator leaves a workstation and unauthorized personnel are able to view a display screen by merely changing their viewing angle only slightly.

Existing techniques that mask fields in a displayed form with asterisks or other symbols, such as those used for passwords, are ineffective and subject to operator error since the typed-in values cannot be visually verified, and the user interface needs to resort to redundant fields, for example, one field to enter a password and a second field to confirm the password.

Thus, there is a need for an improved methodology and system for enabling selective viewing of information presented on a display device.

SUMMARY OF THE INVENTION

A method and implementing system are provided for enabling a user, through the use of a specialized viewing device, to view information on a display device which is not viewable by others who are not equipped with the device. In an exemplary embodiment, selected sensitive information on a display screen is obscured from normal view. A view-enabling device is provided to authorized individuals who are able to use the device to view the sensitive information on the display device. The user looks through the view-enabling device and is able to see the otherwise obscured sensitive information. In one example, obscuring fields are overlaid upon the sensitive information during an obscuring phase at a known overlay frequency and the view-enabling device is synchronized to effectively blockout the user's view of the display during the obscuring phase resulting in an un-obscured view of the sensitive information on the display device to the user.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

It is noted that circuits and devices which are shown in block form in the drawings are generally known to those skilled in the art, and are not specified to any greater extent than that considered necessary as illustrated, for the understanding and appreciation of the underlying concepts of the present invention and in order not to obfuscate or distract from the teachings of the present invention. Although the present invention is herein disclosed using a personal computer in the example, it is understood that the invention applies as well to any environment in which it is desirable to control the viewable access to information presented on a display device.

In an exemplary embodiment of the present invention, a viewing device is used in combination with display rendering technology to hide specific information from those who do not have the viewing device. In one example, a pair of liquid crystal display (LCD) shutter glasses is used although only a single lens is needed. The shutter glasses are similar to those available from "eDimensional" and may include both wireless and wired models. When these glasses are used in three dimensional applications, the glasses block the view of one eye and then the other eye in rapid succession at a set frequency rate. This blocking action is synchronized with the left and right eye views of an image being displayed on a display device to simulate a stereoscopic field. As used in the present invention, a similar blocking action is used to temporarily block the eyes from seeing the application of decoy information such as a field of asterisks overlaid upon or covering one or more sensitive data fields which are presented on a display screen. This blocking technique requires only one blocking lens but may be implemented using two lenses for convenience. The areas that are blocked from normal view may comprise one or more fields or a designated portion of the entire screen or the entire screen as appropriate depending upon how the system is configured and what level of privacy is required. The shutter frequency of the glasses or lens is synchronized with the frequency of the overlay pattern imposition such that a casual observer without the viewing device will see "noise" or obscured information and only a user equipped with the synchronized glasses will not see the noise or the blocking overlay but rather see the actual un-obscured information on the display.

Figure 1:
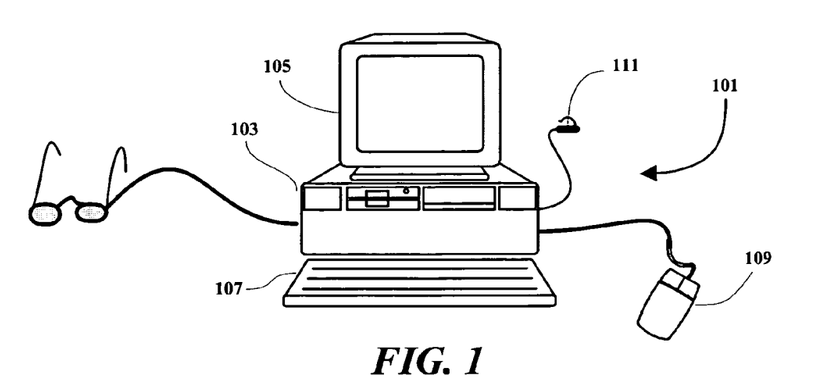
FIG. 1 is an illustration showing an exemplary environment in which the present invention may be used.

With reference to FIG. 1, the various methods discussed herein may be implemented within a computer network including a computer terminal 101, which may comprise either a workstation, personal computer (PC), laptop computer or a wireless computer system or so called personal digital assistant (PDA) or other device which is capable of displaying text or other sensitive information. In general, an implementing computer system may include any computer system and may be implemented with one or several processors in a wireless system or a hard-wired multi-bus system in a network of similar systems.

In the FIG. 1 example, a computer system includes a processor unit 103 which is typically arranged for housing a processor circuit along with other component devices and subsystems of a computer terminal 101. The computer terminal 101 also includes a monitor unit or display device 105, a keyboard 107 and a mouse or pointing device 109, which are all interconnected with the computer terminal illustrated. Also shown is a connector 111 which is arranged for connecting a modem within the computer terminal to a communication line such as a telephone line in the present example. The present invention may also be implemented in a wireless or cellular system as noted above as well as within any device capable of displaying information.

Figure 2:
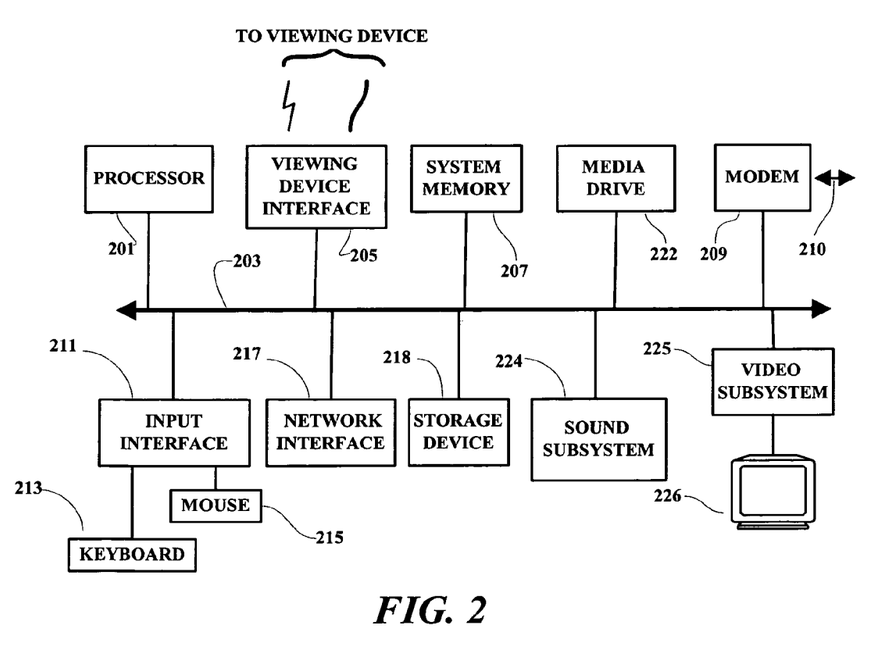
FIG. 2 is a block diagram of processing circuitry which is implemented in one embodiment of the present invention.

Several of the major components of the terminal 101 are illustrated in FIG. 2. A processor circuit 201 is connected to a system bus 203 which may be any host system bus. It is noted that the processing methodology disclosed herein will apply to many different bus and/or network configurations. A viewing device interface 205 and a system memory unit 207 are also connected to the bus 203. The viewing device interface 205 is arranged to be connected either to a single blocking lens device or a pair of blocking glasses. A modem 209 is arranged for connection 210 to a communication line, such as a telephone line, through a connector 111 (FIG. 1). The modem 209, in the present example, selectively enables the computer terminal 101 to establish a communication link and initiate communication with network and/or email server through a network connection such as the Internet. Such connections may also be established using a hard-wired system or a wireless coupling. When sensitive information is contained in forms downloaded through the Internet, or created for uploading through the Internet, the present invention is implemented to selectively block the sensitive information presented on the user's display device such that only an authorized user who has the necessary viewing device is able to see the sensitive information. A similar system may be implemented at a server site where the information is to be processed. The viewing device interface contains circuitry for determining the scanning frequency for a display device which may be stored in a file in system memory. This frequency, or a derivative or related frequency is applied to the viewing device to operate the blocking and unblocking function of the viewing glasses for example.

The system bus 203 is also connected through an input interface circuit 211 to a keyboard 213 and a mouse or pointing device 215. The bus 203 may also be coupled through a hard-wired network interface subsystem 217 which may, in turn, be coupled through a wireless or hard-wired connection to a network of servers on the world wide web. A media drive unit 222 is also shown as being coupled to the bus 203. The media drive unit may be a diskette drive or a CD drive or both. A video subsystem 225, which may include a graphics subsystem, is connected to a display device 226. A storage device 218, which may comprise a hard drive unit, is also coupled to the bus 203. The media drive unit 222 provides a means by which individual diskette or CD programs may be loaded into memory or on to the hard drive, for selective execution by the computer terminal 101. As is well known, program diskettes and CDs containing application programs represented by magnetic indicia on the diskette or optical indicia on a CD, may be read from the diskette or CD drive, and the computer system is selectively operable to read such magnetic or optical indicia and create program signals. Such program signals are selectively effective to cause the computer system to present displays on the screen of a display device and respond to user inputs in accordance with the functional flow of the application program.

Figure 3A:
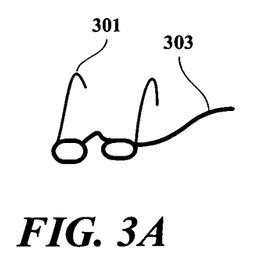
FIGS. 3A-3C illustrate several examples of viewing devices which may be used with various embodiments of the present invention.
Figure 3B:
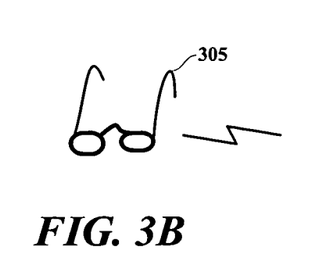
Figure 3C:
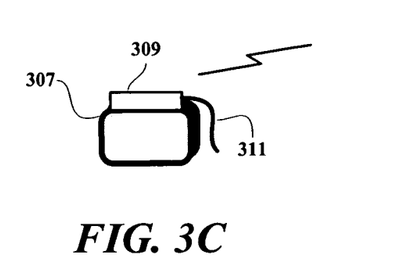

As shown in FIG. 3A-3C, the viewing device which is used in connection with the present invention may take the form of a pair of glasses 301 with a hard-wire connection 303 to the viewing device interface 205 (FIG. 2). The viewing device may also be implemented as a wireless pair of glasses 305 or a single wireless lens device 307. The single lens embodiment contains a small compartment 309, as do all of the viewing device embodiments, for electronics necessary to operate (i.e. blank and un-blank) the LCD lens 307. The lens device in FIG. 3C is arranged to be clipped on to a pair of glasses using a clipping device 311.

Figure 4:
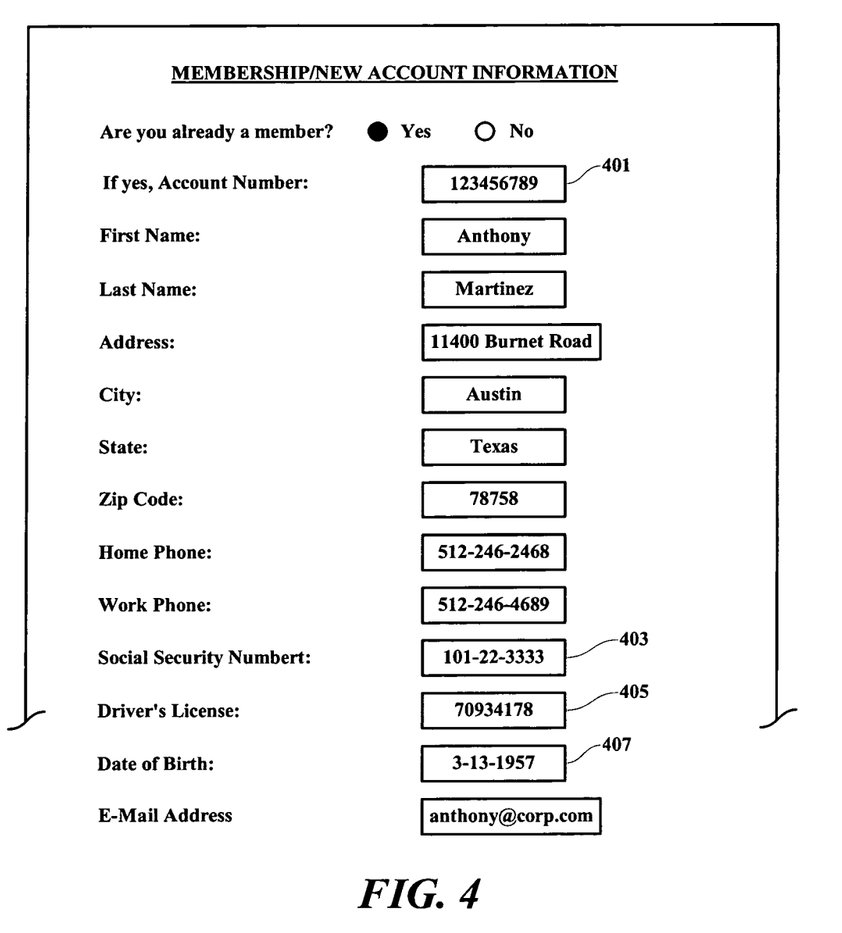
FIG. 4 illustrates an exemplary displayed format showing sensitive information presented on a display device.

In FIG. 4, an exemplary form containing sensitive information is illustrated. The form may be presented on a user's display device when the user is making an application over the Internet for example. The form may also be presented at a processor's terminal where the sensitive information is being processed for membership approval in a book club for example. The displayed form may also have been created by an application at the user's terminal for display at the user's terminal only. In any case, the form contains the certain non-sensitive information such as the name, address, phone and email information which is personal to the user. The exemplary form also has fields containing information which is considered sensitive or even confidential by the user. Such fields include for example, the account number field 401, the social security number field 403, the driver's license field 405 and the data of birth field 407. These sensitive fields are the fields which the user wishes not to be visible to unauthorized personnel who may be passing by the display device.

Figure 5:
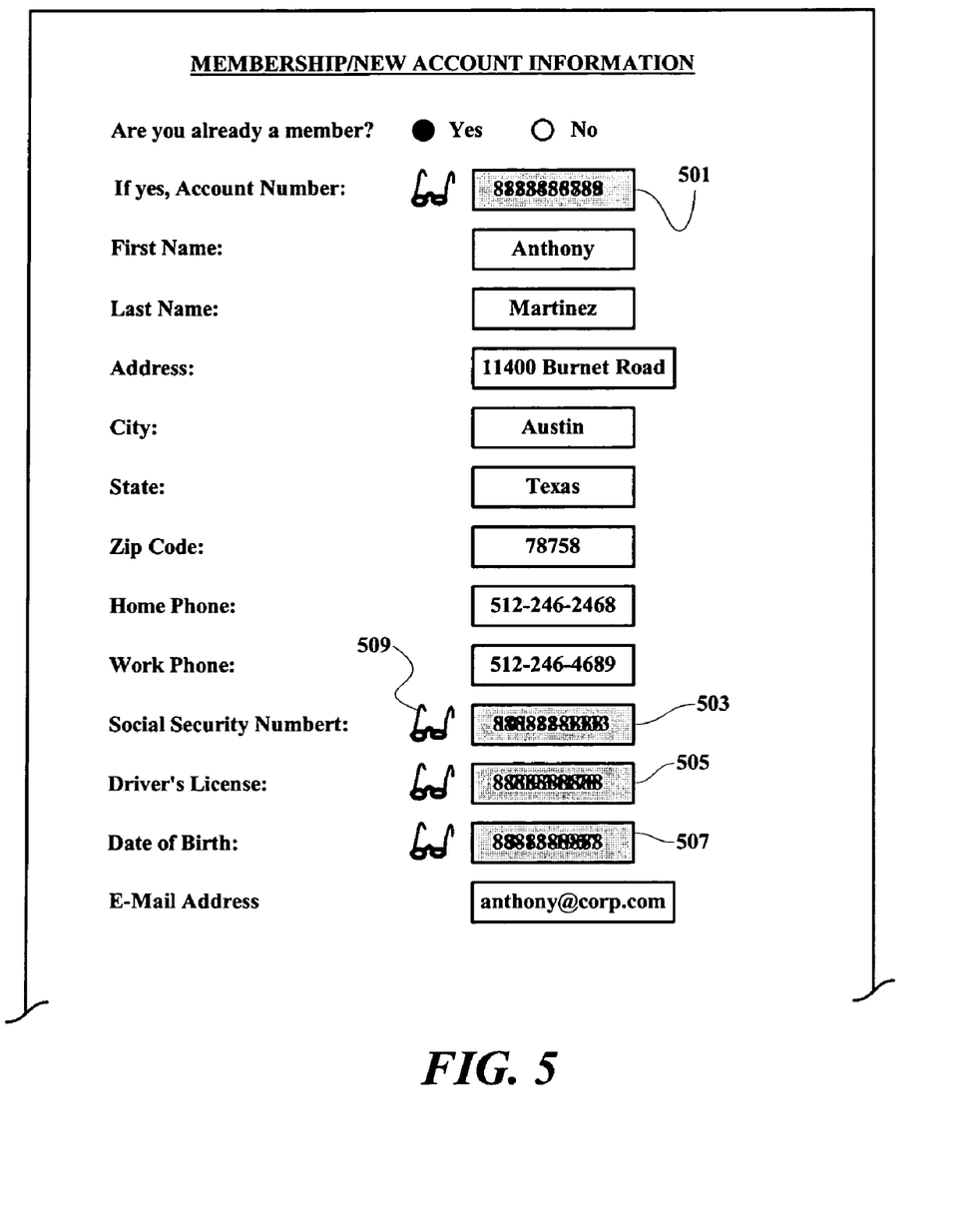
FIG. 5 illustrates the format shown in FIG. 4 with sensitive information obscured from normal view.

FIG. 5 illustrates an example of how the form is modified to prevent a clear display of the sensitive fields of information. As shown, the viewing areas containing account number field 501, social security number field 503, driver's license field 505 and the data of birth field 507 are obscured from clear view by the imposition or overlay of meaningless bogus or decoy information. In the present example, the viewing areas that contains sensitive information are also information fields within the displayed form although it is understood that the obscurable viewing areas may also comprise entire predetermined portions of the display screen such as selected quadrants, or even the entire display screen itself. For purposes of the present disclosure, however, the discussion will focus on an embodiment in which predetermined information fields are selectively obscured by superimposing or overlaying decoy information in the predetermined fields over the sensitive information contained therein. The decoy information in the present example comprises a string of "8"s (the numeral "8"). The obscuration may also be accomplished by modifying the sensitive fields themselves instead of the information contained therein. For example, the sensitive fields may be filled-in with a color such as black to obscure the information contained therein. Also shown are viewing device or glasses icons 509 which indicate which fields require the use of the special blocking glasses in order to view the information contained in the corresponding fields. In one example, information is caused to be presented on the display screen during one scan of the screen and during the next scan the blocking "fields of 8s" for example, are overlaid upon the sensitive fields 501, 503, 505 and 507. This action results in the obscuring of the sensitive information as shown without obscuring other information in the form. FIG. 5 illustrates how this information appears to one viewing the display screen with the benefit of the viewing device.

Figure 6:
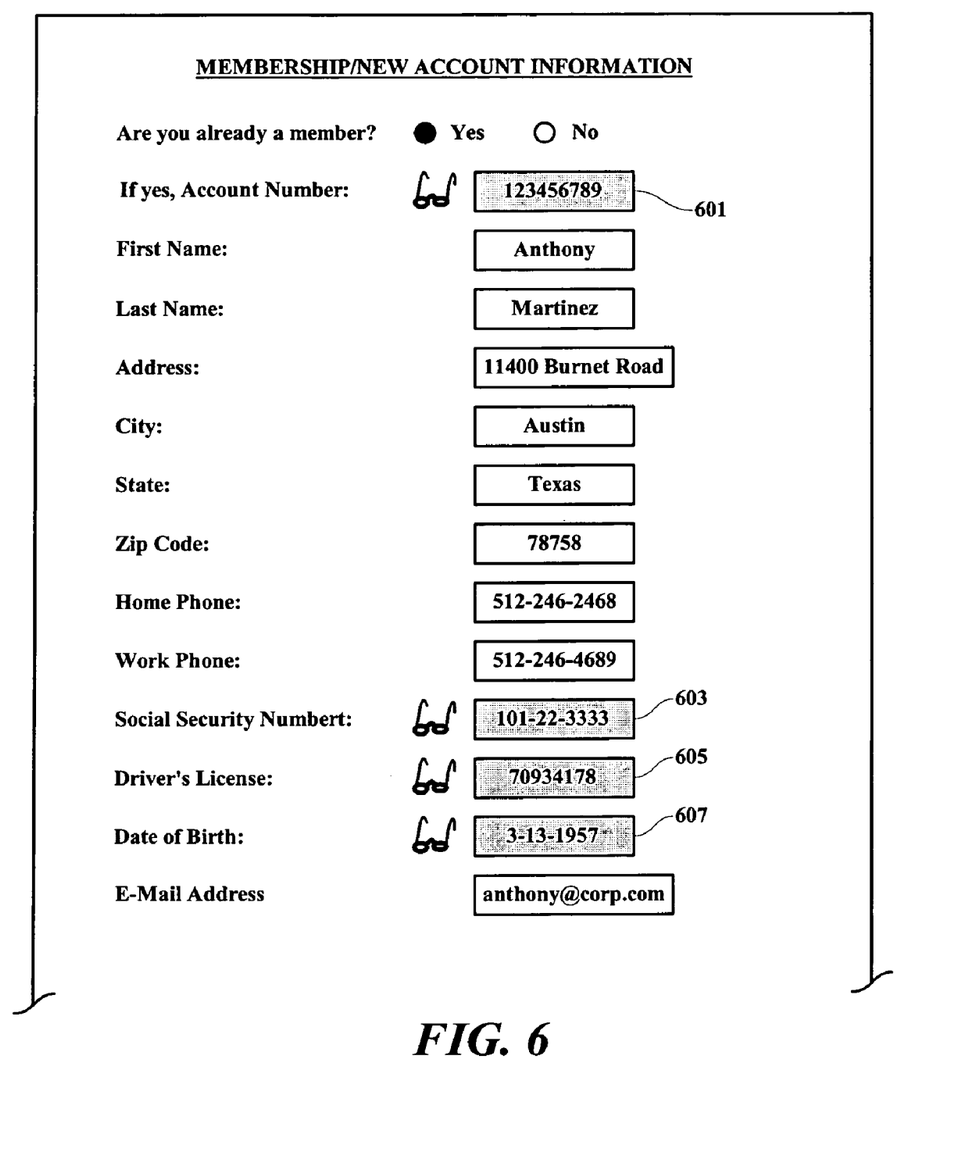
FIG. 6 illustrates the form shown in FIG. 5 as seen through a viewing device implemented in accordance with the present invention.

FIG. 6 illustrates how the information appears to one who is using an embodiment of the viewing device of the present invention. As shown in FIG. 6, all of the information in the form is visible to the user wearing a pair of blocking glasses for example. This is accomplished since the blocking lenses are synchronized to block the view of the user during an obscuring phase of the screen scan so that the user never "sees" the obscuring fields such as the "field of 8s" which overlay the sensitive information fields because the user's view is blocked out when the obscuring fields are presented. To the user of the viewing device, the obscuring fields are never seen to be presented by the display device. It is understood here that although a "field of 8s" is used as an obscuring field in the present example, any pattern or display capable of obscuring sensitive text or graphics may be used as an overlay.

Figure 7:
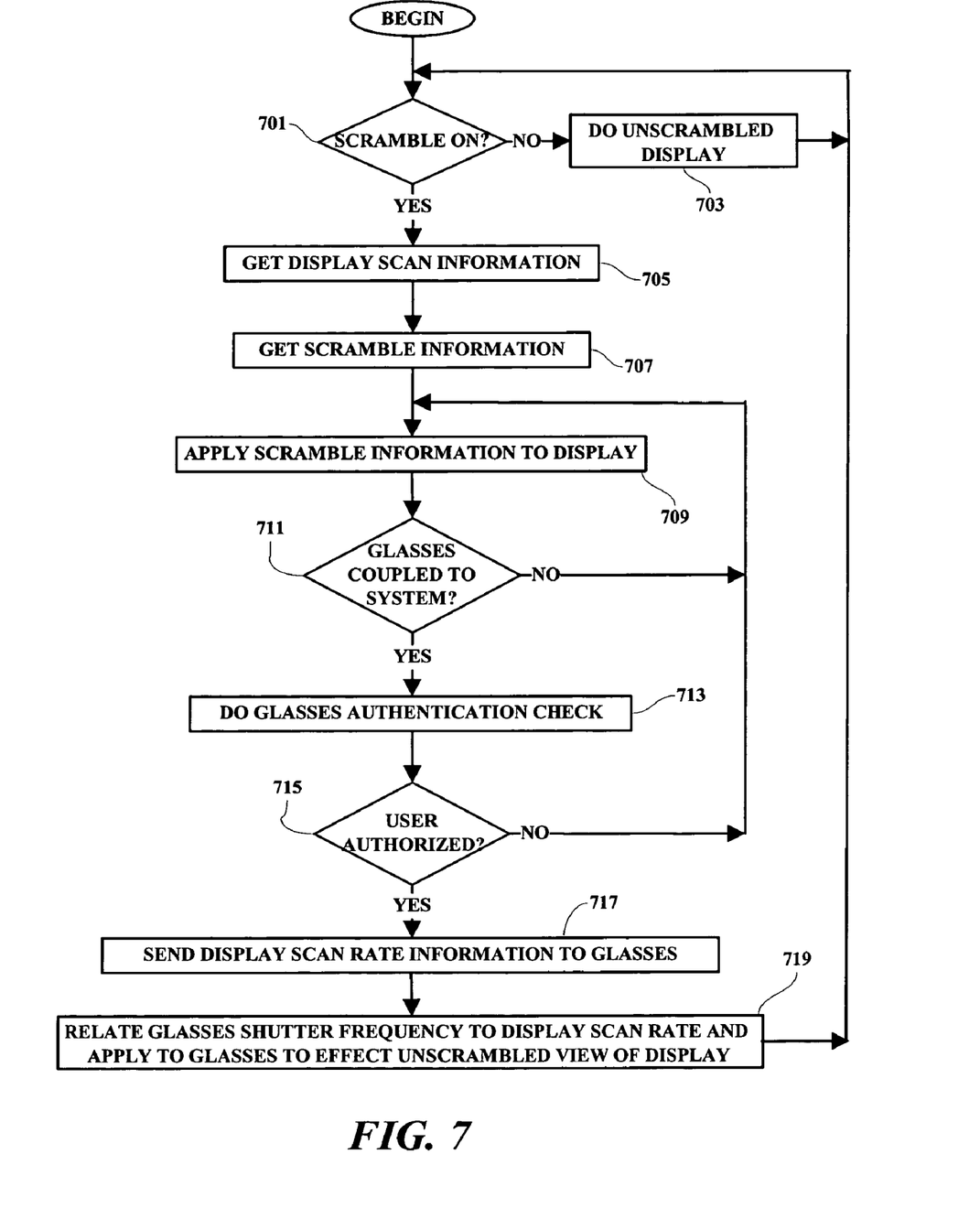
FIG. 7 is a flow chart illustrating a high level operational flow in an exemplary implementation of the present invention.

As shown in FIG. 7, an exemplary methodology is implemented by initially determining that the obscuring or scrambling system is turned on 701 by a user. If the user does not wish to use the scrambling process 701, then the display presents information in a normal unscrambled manner 703. When the scrambling or obscuring feature is turned on 701 by the user, the display scan information is obtained 705 from system memory as well as the scrambling or obscuring pattern information 707. Next, the scramble or obscuring pattern is applied 709 to the designated fields in a displayed form. The specific fields which are considered to contain sensitive information are marked in memory for example, and only those fields will be overlaid with a scrambling or obscuring pattern. Next, a check is made to determine if a viewing device, e.g. glasses, are coupled to the system 711. If not, the scramble pattern continues to be applied 709 to the sensitive fields at a known frequency so that those fields will continue to be obscured to viewers of the display. If it is detected that a viewing device such as a pair of blocking glasses are coupled to the system (through either a wired or wireless coupling), then an authentication check such as a password check may be accomplished 713 to insure that the user is authorized, and if the user is determined to be authorized 715, then the glasses are activated by sending the appropriate blocking frequency 717 to the glasses and the shutter or blocking frequency of the glasses is adjusted so that the glasses are effective to block the user's view during the obscuring phases of the display scans 719. In this way, the user does not see the obscuring pattern but rather only the sensitive information together with the other information presented in the form. The process will continue in this manner until a user turns off the scramble feature 701. The viewing device in the present example will not be activated or effective if the viewing device in not coupled to the system 711 or the user is not authorized 715 to use the viewing device.

In another embodiment of the present invention, the obscuring or scrambling frequency used may be selected by a user from a selection screen. This feature allows users in close proximity to each other to use different obscuring frequencies in order to be able to obscure their respective displays so that those sitting nearby the user will not be able to see sensitive information. The specific scramble or obscuring pattern and/or color may also be selected from a selection screen or palette and different combinations of obscuring patterns, colors and/or frequencies may be used by different users in the same general physical area. In each case, the viewing device for each station will be synchronized with the specific corresponding display device such that each display can be decoded or un-scrambled by only the user's viewing device for that display and no other viewing device.

The method and apparatus of the present invention has been described in connection with a preferred embodiment as disclosed herein. The disclosed methodology may be implemented in a wide range of sequences to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored on a CD, disk or diskette (portable or fixed), or other memory device, from which it may be loaded into memory and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for enabling selective viewing of designated information in one or more predetermined viewing areas within a display screen of a display device, said method comprising:

effecting an obscuration of said designated information at a predetermined frequency such that said designated information appears obscured on said display screen, said obscuration comprising a superimposition of obscuring indicia over said designated information;

viewing said display screen using a viewing device, said viewing device being selectively operable for blocking a view of said predetermined viewing areas during said obscuration, said blocking being effected at said predetermined frequency whereby said designated information as viewed through said viewing device appears un-obscured to a user looking through said viewing device; and accomplishing an authentication process before enabling said blocking, said authentication process comprising receiving input from a user to insure that said user is authorized to use said viewing device.

2. The method as set forth in claim 1 wherein said obscuration is accomplished by obscuring only said designated information.

3. The method as set forth in claim 1 wherein said obscuration is accomplished by obscuring said predetermined viewing areas.

4. The method as set forth in claim 1 wherein said predetermined viewing area comprises one or more fields.

5. The method as set forth in claim 1 wherein said predetermined viewing area comprises said display screen in its entirety.

6. The method as set forth in claim 1 wherein said obscuration comprises an overlaying of predetermined decoy information in said predetermined viewing areas.

7. The method as set forth in claim 1 wherein said viewing device comprises a lens device and blocking means, said blocking means being operable in combination with said lens device to accomplish said blocking.

8. The method as set forth in claim 7 wherein said lens device comprises a liquid crystal device, said liquid crystal device being arranged to receive blocking signals to effect said blocking.

9. The method as set forth in claim 7 wherein said lens device comprises a single lens element.

10. The method as set forth in claim 7 wherein said lens device comprises two lens elements.

11. The method as set forth in claim 1 wherein said viewing device is coupled to said display device for synchronizing said blocking with said obscuration.

12. The method as set forth in claim 11 wherein said viewing device is coupled to said display device through a wireless coupling.

13. The method as set forth in claim 11 wherein said viewing device is coupled to said display device through a hard wire coupling.

14. A method for enabling selective viewing of designated information in one or more predetermined viewing areas within a display screen of a display device, said method comprising:

effecting an obscuration of said designated information at a predetermined frequency such that said designated information appears obscured on said display screen, said obscuration comprising a superimposition of obscuring indicia over said designated information; and viewing said display screen using a viewing device, said viewing device being selectively operable for blocking a view of said predetermined viewing areas during said obscuration, said blocking being effected at said predetermined frequency whereby said designated information as viewed through said viewing device appears un-obscured to a user looking through said viewing device, said obscuration comprising an overlaying of predetermined decoy information in said predetermined viewing areas.

15. A storage medium including machine readable coded indicia, said storage medium being selectively coupled to a reading device, said reading device being selectively coupled to processing circuitry within a computer system, said reading device being selectively operable to read said machine readable coded indicia and provide program signals representative thereof, said program signals being selectively operable for enabling selective viewing of designated information in one or more predetermined viewing areas within a display screen of a display device by:

effecting an obscuration of said designated information at a predetermined frequency such that said designated information appears obscured on said display screen, said obscuration comprising a superimposition of obscuring indicia over said designated information;

providing blocking signals for application to a viewing device, said viewing device being selectively operable for blocking a view of said predetermined viewing areas during said obscuration, said blocking being effected at said predetermined frequency whereby said designated information as viewed through said viewing device appears un-obscured to a user looking through said viewing device; and accomplishing an authentication process before enabling said blocking, said authentication process comprising receiving input from a user to insure that said user is authorized to use said viewing device.

16. The medium as set forth in claim 15 wherein said obscuration is accomplished by obscuring only said designated information.

17. The medium as set forth in claim 15 wherein said obscuration is accomplished by obscuring said predetermined viewing areas.

18. The medium as set forth in claim 15 wherein said obscuration comprises an overlaying of predetermined decoy information in said predetermined viewing areas.

19. The medium as set forth in claim 15 wherein said viewing device comprises a lens device and blocking means, said blocking means being operable in combination with said lens device to accomplish said blocking.

20. The medium as set forth in claim 19 wherein said lens device comprises a liquid crystal device, said liquid crystal device being arranged to receive said blocking signals to effect said blocking.

21. The medium as set forth in claim 19 wherein said lens device comprises a single lens element.

22. The medium as set forth in claim 19 wherein said lens device comprises two lens elements.

23. The medium as set forth in claim 15 wherein said viewing device is coupled to said display device for synchronizing said blocking with said obscuration.

24. The medium as set forth in claim 23 wherein said viewing device is coupled to said display device through a wireless coupling.

25. The medium as set forth in claim 23 wherein said viewing device is coupled to said display device through a hard wire coupling.

26. A storage medium including machine readable coded indicia, said storage medium being selectively coupled to a reading device, said reading device being selectively coupled to processing circuitry within a computer system, said reading device being selectively operable to read said machine readable coded indicia and provide program signals representative thereof, said program signals being selectively operable for enabling selective viewing of designated information in one or more predetermined viewing areas within a display screen of a display device by:

effecting an obscuration of said designated information at a predetermined frequency such that said designated information appears obscured on said display screen, said obscuration comprising a superimposition of obscuring indicia over said designated information; and providing blocking signals for application to a viewing device, said viewing device being selectively operable for blocking a view of said predetermined viewing areas during said obscuration, said blocking being effected at said predetermined frequency whereby said designated information as viewed through said viewing device appears un-obscured to a user looking through said viewing device, said obscuration comprising an overlaying of predetermined decoy information in said predetermined viewing areas.

27. A system for enabling selective viewing of designated information in one or more predetermined display areas within a display screen of a display device, said system comprising:

a system bus;
a CPU device connected to said system bus;
memory means connected to said system bus;

a display device connected to said system bus; and a viewing device coupled to said system bus, said system being selectively operable for effecting an obscuration of said designated information at a predetermined frequency such that said designated information appears obscured on said display screen, said obscuration comprising a superimposition of obscuring indicia over said designated information, said system being further operable for providing blocking signals for application to said viewing device, said viewing device being selectively operable for blocking a view through said viewing device of said predetermined viewable areas during said obscuration, said blocking being effected at said predetermined frequency whereby said designated information as viewed through said viewing device appears un-obscured to a user looking through said viewing device, said system being further operable for accomplishing an authentication process before enabling said blocking, said authentication process comprising receiving input from a user to insure that said user is authorized to use said viewing device.

28. A system for enabling selective viewing of designated information in one or more predetermined display areas within a display screen of a display device, said system comprising:

a system bus;

a CPU device connected to said system bus;

memory means connected to said system bus;

a display device connected to said system bus; and a viewing device coupled to said system bus, said system being selectively operable for effecting an obscuration of said designated information at a predetermined frequency such that said designated information appears obscured on said display screen, said obscuration comprising a superimposition of obscuring indicia over said designated information, said system being further operable for providing blocking signals for application to said viewing device, said viewing device being selectively operable for blocking a view through said viewing device of said predetermined viewable areas during said obscuration, said blocking being effected at said predetermined frequency whereby said designated information as viewed through said viewing device appears un-obscured to a user looking through said viewing device, said obscuration comprising an overlaying of predetermined decoy information in said predetermined viewable areas.

* * * * *